US009868116B2

(12) United States Patent
Casci et al.

(10) Patent No.: US 9,868,116 B2
(45) Date of Patent: Jan. 16, 2018

(54) DIRECT INCORPORATION OF IRON COMPLEXES INTO SAPO-34 (CHA) TYPE MATERIALS

(71) Applicant: Johnson Matthey Public Limited Company, London (GB)

(72) Inventors: John Leonello Casci, Cleveland (GB); Paul A. Wright, Fife (GB); Alessandro Turrina, Fife (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/009,955

(22) Filed: Jan. 29, 2016

(65) Prior Publication Data

US 2016/0220988 A1 Aug. 4, 2016

Related U.S. Application Data

(60) Provisional application No. 62/109,362, filed on Jan. 29, 2015.

(51) Int. Cl.

| | |
|---|---|
| B01D 53/56 | (2006.01) |
| B01D 53/86 | (2006.01) |
| B01D 53/94 | (2006.01) |
| B01J 23/745 | (2006.01) |
| B01J 29/85 | (2006.01) |
| B01J 37/00 | (2006.01) |
| B01J 37/04 | (2006.01) |
| B01J 35/00 | (2006.01) |
| C01B 39/54 | (2006.01) |

(52) U.S. Cl.
CPC .............. *B01J 29/85* (2013.01); *B01D 53/94* (2013.01); *B01D 53/9413* (2013.01); *B01J 35/002* (2013.01); *C01B 39/54* (2013.01); *B01D 2255/20738* (2013.01); *B01D 2255/50* (2013.01); *B01J 2229/186* (2013.01)

(58) Field of Classification Search
CPC .............. B01D 53/565; B01D 53/8628; B01D 53/9413; B01D 53/9418; B01D 2255/20738; B01D 2255/50; B01D 2257/402; B01D 2257/404; B01D 2258/012; B01J 23/745; B01J 29/85; B01J 37/00; B01J 37/04
See application file for complete search history.

(56) References Cited

U.S. PATENT DOCUMENTS

| | | | |
|---|---|---|---|
| 4,440,871 A | 4/1984 | Lok et al. | |
| 6,773,688 B2 | 8/2004 | Mertens et al. | |
| 7,052,664 B2 | 5/2006 | Mertens et al. | |
| 7,459,136 B2 | 12/2008 | Mertens et al. | |
| 7,645,718 B2 * | 1/2010 | Li | B01D 53/9418 423/700 |
| 7,785,554 B2 | 8/2010 | Mertens et al. | |
| 7,883,678 B2 * | 2/2011 | Li | B01D 53/9418 423/212 |
| 8,541,331 B2 | 9/2013 | Li et al. | |
| 8,603,432 B2 | 12/2013 | Andersen et al. | |
| 9,011,807 B2 * | 4/2015 | Mohanan | B01J 29/76 423/213.2 |
| 9,302,256 B2 * | 4/2016 | Mohanan | B01J 29/76 |
| 9,409,787 B2 | 8/2016 | Chen et al. | |
| 2012/0251422 A1 * | 10/2012 | Li | B01D 53/9418 423/239.1 |
| 2014/0161718 A1 | 6/2014 | Qi et al. | |
| 2015/0231617 A1 * | 8/2015 | Andonova | B01D 53/9418 423/706 |
| 2015/0343425 A1 * | 12/2015 | Ibe | B01J 37/18 502/74 |
| 2016/0256860 A1 * | 9/2016 | Zhang | B01J 29/85 |

FOREIGN PATENT DOCUMENTS

| | | | | |
|---|---|---|---|---|
| CN | 104841480 A | * | 8/2015 | ......... B01D 53/9418 |
| WO | 2012138652 | | 10/2012 | |
| WO | WO 2012/138652 A1 | * | 10/2012 | ......... B01D 53/9418 |
| WO | 2015128668 A1 | | 9/2015 | |

OTHER PUBLICATIONS

Kang, Misook; Methanol conversion on metal-incorporated SAPO-34s (MeAPSO-34s); Journal of Molecular Catalysis A: Chemical 160 2000. 437-444.
Baldwin et al.; Binding of Dioxygen to Iron(I1). Reversible Behavior in Solution; JACS 1973, 95(17) 5757-5759.
Deka et al.; Changing active sites in Cu-CHA catalysts: deNOx selectivity as a function of the preparation method; Microporous and Mesoporous Materials 166 (2013) 144-152.
Martinez-Franco; Rational direct synthesis methodology of very active and hydrothermally stable Cu-SAPO-34 molecular sieves for the SCR of NOx; Applied Catalysis B: Environmental 127 (2012) 273-280.
Kang et al.; No Decomposition on Metal-incorporated Microporous Materials; (1998), Korean Society of Environmental Engineers; Environ. Eng. Res., vol. 3, No. 3, pp. 175-182.
Um et al.; Synthesis of FeAPSO-34 Materials and their Catalytic Performance on Methanol Conversion; Korean Journal of Materials Research; vol. 9, No. 8 (1999).
Korendovych et al.; Iron(II) Complexes with Amide-Containing Macrocycles as Non-Heme Porphyrin Analogues; Inorg. Chem. 2007, 46, 4197-4211.
Kucherov et al.; In situ high-temperature ESR characterization of FeZSM-5 and FeSAPO-34 catalysts in flowing mixtures of NO, C3H6, and O2; Catalysis Letters 56 (1998) 173-181.
Liu et al.; Synthesis, characterization and catalytic properties of SAPO-34 synthesized using diethylamine as a template; Microporous and Mesoporous Materials 111 (2008) 143-149.
Lok et al.; Silicoaluminophosphate Molecular Sieves: Another New Class of Microporous Crystalline Inorganic Solids; J. Am. Chem. Soc. 1984, 106, 6092-6093.
Picone et al.; A co-templating route to the synthesis of Cu SAPO STA-7, giving an active catalyst for the selective catalytic reduction of NO; Microporous and Mesoporous Materials 146 (2011) 36-47.

* cited by examiner

*Primary Examiner* — Timothy Vanoy

(57) ABSTRACT

Fe-SAPO-34 silicoaluminophosphates having $Fe^{2+}$ organic complexes and methods for their direct synthesis in the absence of a co-templating agent are described. Fe-SAPO-34 silicoaluminophosphate having $Fe^{3+}$ located in extra-framework locations within the pores of cages of the crystal are described. They are prepared by calcining the Fe-SAPO-34 silicoaluminphosphates containing $Fe^{2+}$ polyamine complexes. Methods of using the Fe-SAPO-34 having $Fe^{3+}$ located in extra-framework locations within the pores of cages of the crystal in the treatment of exhaust gases are described.

17 Claims, 12 Drawing Sheets

DIRECT INCORPORATION OF IRON COMPLEXES INTO SAPO-34 (CHA) TYPE MATERIALS

FIELD OF INVENTION

The invention relates to iron-containing silicoaluminophosphate (Fe-SAPO-34) molecular sieves, processes for manufacturing iron-containing silicoaluminophosphate molecular sieves and methods of using such molecular sieves in reducing nitrogen oxides (NOx) in exhaust gases.

BACKGROUND OF THE INVENTION

Silicoaluminophosphates (SAPOs) are synthetic materials having a three-dimensional microporous aluminophosphate crystalline framework with silicon incorporated into the framework. The framework structure consists of $PO_2^+$, $AlO_2^-$, and $SiO_2$ tetrahedral units. The empirical chemical composition, on an anhydrous basis, is:

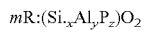

$$mR:(Si_xAl_yP_z)O_2$$

wherein, R represents at least one organic templating agent present in the intracrystalline pore system; m represents the moles of R present per mole of $(Si_xAl_yP_z)O_2$ and has a value from zero to 0.3; and x, y, and z represent the mole fractions of silicon, aluminum, and phosphorous, respectively, present as tetrahedral oxides. These compounds were disclosed in U.S. Pat. No. 4,440,871 as being a class of silicon-substituted aluminophosphates, which are both crystalline and microporous and exhibit properties characteristic of both aluminosilicate zeolites and aluminophosphates. The general principles of zeolite synthesis are well documented, e.g. "Synthesis of High-silica Aluminosilicate Zeolites", Study of Surface Science and Catalysis, vol. 33, Elsevier, 1987 and "Synthesis of Aluminosilicate Zeolites and Related Silica-based Materials", Catalysis and Zeolites: Fundamentals and Applications, Springer, 1999.

U.S. Pat. Nos. 6,773,688 and 7,052,664 disclose a process for manufacturing a SAPO-34 silicoaluminophosphate molecular sieve, the process comprising the steps of: (a) providing sources of aluminum, of phosphorus and of silicon, wherein the source of silicon is in solution with a water-miscible organic base; (b) forming a synthesis mixture from the sources; and (c) treating the synthesis mixture for a period of time and at a temperature sufficient to form the silicoaluminophosphate molecular sieve. These patents also disclose:

In the manufacture of SAPO-34, it has proved advantageous to use a mixture of templates. For example, a suitable template mixture is TEAOH, which is readily soluble in water, and DPA, which dissolves in water with some difficulty.

U.S. Pat. No. 7,459,136 discloses a process for manufacturing a silicoaluminophosphate molecular sieve, the process comprising the steps of: (a) dissolving a silicon source into a solution containing a structure-directing template at conditions sufficient to establish a dissolved silicon concentration of at least 0.05 wt. %; (b) adding at least one aluminum source and at least one phosphorus source to at least a portion of the solution of step (a) to form a synthesis mixture, wherein at least the major portion of the aluminum source and phosphorus source are added to the solution after the solution has reached a dissolved silicon concentration of at least 0.03 wt. %; and (c) treating the synthesis mixture at a temperature sufficient to form the silicoaluminophosphate molecular sieve, wherein the silicoaluminophosphate molecular sieve comprises at least one intergrown phase of molecular sieves having AEI and CHA framework types, wherein the intergrown phase has an AEI/CHA mass ratio of from about 5/95 to 40/60 as determined by DIFFaX analysis.

U.S. Pat. No. 7,645,718 discloses a process for preparing Fe-exchanged SAPO-34 by a liquid phase ion-exchange method using an iron salt solution. Only small amounts of Fe (≤1.4%) were exchanged onto SAPO-34 using liquid phase ion exchange.

The process for preparing Fe-SAPO-34 by sublimation of $FeCl_3$ for use in SCR applications is disclosed in Kucherov et al., Catalysis Letters 56 (1998) 173-181. The dispersion of Fe in SAPO-34 is not as good as on the medium pore ZSM-5 using the sublimation method.

U.S. Pat. No. 7,785,554 discloses a process for manufacturing a silicoaluminophosphate molecular sieve comprising at least one intergrown phase of AEI and CHA framework types, the process comprising the steps of: (a) combining at least one silicon source, at least one phosphorus source, at least one aluminum source, and at least one structure-directing-agent (R) to form a mixture; and (b) treating the mixture at crystallization conditions sufficient to form the silicoaluminophosphate molecular sieve, wherein the mixture prepared in step (a) has a molar composition of: $(n)SiO_2/Al_2O_3/(m)P_2O_5/(x)R/(y)H_2O$ wherein n ranges from about 0.005 to about 0.6, m ranges from about 0.6 to about 1.2, x ranges from about 0.5 to about 0.99, and y ranges from about 10 to about 40.

U.S. Pat. No. 8,541,331 discloses a method for preparing iron-containing aluminosilicate zeolites having both framework iron and iron cations on ion-exchange sites.

U.S. Pat. No. 8,603,432 discloses a method for preparing Fe-SAPO-34 from a slurry of SAPO-34 in a ferric nitrate solution.

U.S. Patent Application Publication No. US 2012/0251422 A1 discloses an Fe-SAPO-34 molecular sieve, where the molecular sieve contains both framework iron and iron cations at ion-exchange sites. A method of making a catalyst comprising Fe-SAPO-34 comprises mixing sources of an iron salt, alumina, silica, phosphate, at least one organic structural directing agent and water to form a gel; heating the gel in an autoclave at a temperature ranging from 140 to 220° C. to form a crystalline Fe-SAPO-34 product; calcining the product; and contacting the product with acid or steam.

The literature also describes iron being loaded into SAPO-34 using different iron salts. (Y. Wei et al., Catalysis Today, 131, 2008, 262-269; M. Kang et al., Journal of Molecular Catalysis A: Chemical 160, 2000, 437-444; M. Kang et al., Envirn. Eng. Res, 3, 3, 175-182, 1998; and M. Heon et al., Korean Journal of materials research, 9, 8, 1999)

There is a need for an improved and simplified method of making Fe-SAPO-34 that does not require ion-exchange or impregnation, where the Fe-SAPO-34 displays good catalytic activity and stability. The Inventors have discovered a method of directly synthesizing Fe-SAPO-34 that contains both framework iron and iron cations at ion-exchange sites and various forms of the Fe-SAPO-34 produced by the methods.

SUMMARY OF THE INVENTION

In one aspect of the invention, compositions comprise organic complexes of Fe in a SAPO-34 structure where the Fe is present as $Fe^{+2}$ cations. These complexes have a purple color and a band with a peak at around 550 nm in the UV-visible adsorption spectra. These cations can be present in two possible environments. The Fe-complexes can function as a reversible $O_2$ carrier.

In another aspect of the invention, calcined compositions comprise Fe-SAPO-34 where the iron is present as $Fe^{+3}$ and the iron cations are located mainly in extra-framework positions. These compositions have a broad band from 300-700 nm in the UV-visible spectra. The calcined compositions are catalytically active in converting NOx.

In yet another aspect of the invention, Fe-SAPO-34 is prepared using Fe-complexes as structure-directing agents. The complexing ligands described herein can be used to control the incorporation of iron cations in extra-framework position.

In still another aspect of the invention, Fe-containing SAPO-34 having the iron is present as $Fe^{+3}$ with these cations located mainly in extra-framework positions can be used to convert NOx from exhaust gases.

DETAILED DESCRIPTION OF THE INVENTION

Figure 1A:
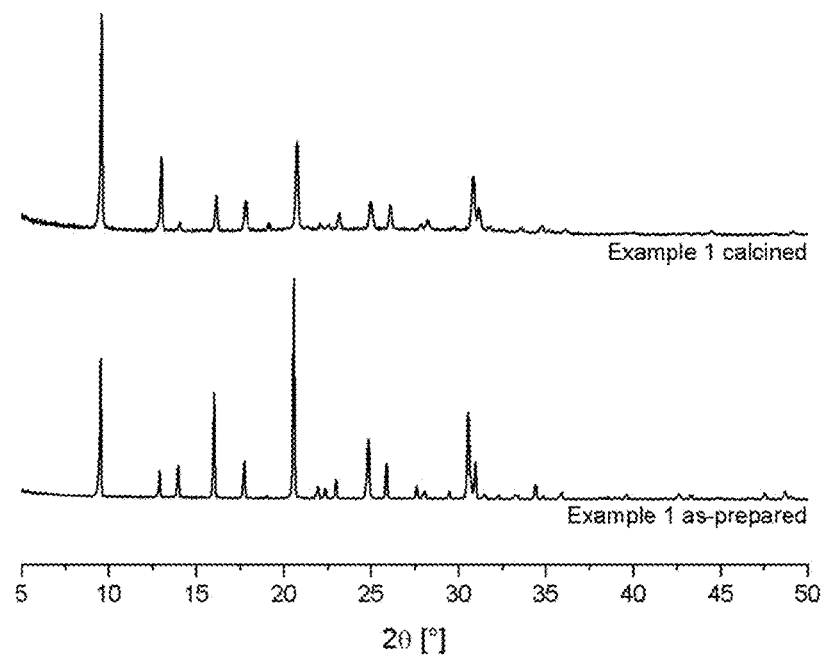
FIGS. 1A-1H show the XRD spectra of as-prepared and calcined material from Examples 1-12.

As used in this specification and the appended claims, the singular forms "a", "an" and "the" include plural referents unless the context clearly indicates otherwise. Thus, for example, reference to "a catalyst" includes a mixture of two or more catalysts, and the like.

As used herein, the term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

As used herein, the term "about" means approximately and refers to a range that is optionally ±25%, preferably ±10%, more preferably, ±5%, or most preferably ±1% of the value with which the term is associated.

When a range, or ranges, for various numerical elements are provided, the range, or ranges, can include the values, unless otherwise specified.

The invention includes methods of preparing Fe-SAPO-34 via direct synthesis using different metal complexes that are formed by adding an iron complex, such as a complex formed by a polyamine and iron (II) acetate, directly to the silicoaluminophosphate and the synthesis is performed in the absence of a co-templating agent.

The term "template(s)" typically refer to structure directing agent(s) (SDA) that is(are) used to form channels or tunnel-like structures (also called microporous structure) within the molecular sieve composition. For the SAPO materials to be used as catalyst compositions, however, the template must be removed to open up the channels or tunnel-like structures. Typically, this is done during the preparation of a SAPO-containing catalyst by calcining the template-containing SAPO powder.

A co-templating agent is defined herein as an organic additive that, together with the main structure directing agent (SDA), drives the formation of a specific framework type. The co-templating agent may template the same cage or channel of the SDA in a cooperative effect, or template a second different cage (like TEAOH within STA-7). [Picone, A. L.; Warrender, S. J.; Slawin, A. M. Z.; Dawson, D. M.; Ashbrook, S. E.; Wright, P. A.; Thompson, S. P.; Gaberova, L.; Llewellyn, P. L.; Moulin, B.; Vimont, A.; Daturi, M.; Park, M. B.; Sung, S. K.; Nam, I; Hong, S. B. Microporous Mesoporous Mater. 2011, 146, 36-47.] In the syntheses of Cu-SAPO-34 by Deka [U. Deka, I. Lezcano-Gonzalez, S. J. Warrender, A. Lorena, P. A. Wright, B. M. Weckhuysen, A. M. Beale, Microporous Mesoporous Mater. 2013, 166, 144-152] and Franco [R. M.-Franco, M. Moliner, C. Franch, A. Kustov, A. Corma, *Appl. Catal., B* 2012, 127, 273-280] tetraethylammonium hydroxide and diethylamine have been used as co-templating agents, in each case together with the copper-amine complex. Both are well known to be suitable SDAs on their own for the preparation of SAPO-34. B. M. Lok, C. A. Messina, R. L. Patton, R. T. Gajek, T. R. Cannan, E. M. Flanigen, *J. Am. Chem. Soc.* 1984, 106, 6092-6093; B. M. Lok, R. L. Patton, R. T. Gajek, T. R. Cannan and E. M. Flanigen, U.S. Pat. No. 4,440,871 1984; G. Liu, P. Tian, J. Li, D. Zhang, F. Zhouand Z. Liu, *Microporous Mesoporous Mater.* 2008, 111, 143-149. In the absence of these co-templating agents the Cu-SAPO-34 phases obtained with the copper amine precursors are less crystalline suggesting that the Cu2+-complexes do not have an optimum "fit" within the CHA cages of SAPO-34.

"Direct synthesis" refers to a method that does not require an iron-doping process after the SAPO-34 has been formed, such as a subsequent ion-exchange or impregnation method.

"Selective Catalytic Reduction" or "SCR" refers to the reduction of $NO_x$ (typically with ammonia or urea) in the presence of oxygen to form nitrogen ($N_2$) and water ($H_2O$).

"Exhaust gas" refers to any waste gas formed in an industrial process or operation and by internal combustion engines, such as from any form of motor vehicle.

In one aspect of the invention, compositions comprise organic complexes of Fe in a SAPO-34 structure, where the Fe is present as $Fe^{+2}$ cations. These cations can be present in two possible environments, as indicated by isomers shifts in analysis of the compositions using Mössbauer spectroscopy. These compositions do not contain $Fe^{3+}$ in their structures, when analysed using Mössbauer spectroscopy (<3%, the limit of detection). When a sample was analysed by Mössbauer spectroscopy at the temperature of liquid helium temperature, only $Fe^{2+}$ species were observed. This indicates that the amount of $Fe^{3+}$ in the sample, if any, would have to be less than the experimental uncertainty, 3% of the total amount of iron present. These complexes have a purple color and a band with a peak at around 550 nm is present in the UV-visible adsorption spectra. The Fe-complexes can function as a reversible $O_2$ carrier.

In another aspect of the invention, calcined compositions comprise Fe-SAPO-34, where the iron is present as $Fe^{+3}$ and the iron cations are located mainly in extra-framework positions, as indicated by analysis of the compositions using Mössbauer spectroscopy and UV-visible spectra. These compositions have a broad band from 300-700 nm in the UV-visible spectra. The calcined compositions are catalytically active in converting NOx.

In yet another aspect of the invention, Fe-SAPO-34 is prepared using Fe-complexes as structure-directing agents. The complexing ligands described herein can be used to control the incorporation of iron cations in extra-framework position. Fe-SAPO-34 compositions comprising polyamine complexes of Fe in a SAPO-34 structure, where the Fe is present as $Fe^{+2}$ cations, can be prepared by adding the polyamine and an $Fe^{2+}$ salt directly to a silicoaluminophosphate gel rather than as a preformed metal complex. The polyamine, which acts as a template in the formation of the Fe-SAPO-34, is preferably a liner polyamine, or a salt or mixture thereof. Preferably, the polyamine is diethylenetriamine (DETA); triethyletetramine (TETA); tetraethylenepentamine (TEPA); pentaethylenehexamine (PEHA) or mixtures thereof. When an $Fe^{2-}$ salt is mixed with a polyamine, an organic complex is formed. The organic complexes formed from the above preferred polyamines are shown below.

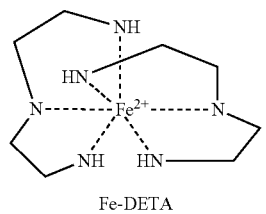

Fe-DETA

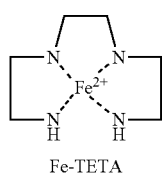

Fe-TETA

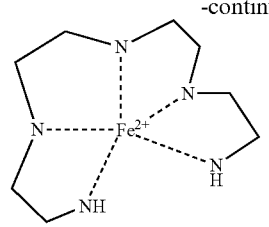

Fe-TEPA

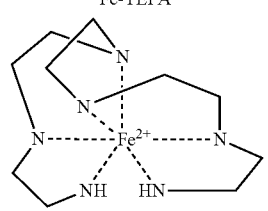

Fe-PEHA

The silicoaluminophosphate gel can be formed by mixing orthophosphoric acid, silica and aluminum hydroxide in deionized water. After the polyamine is added to the mixture, additional polyamine or a solution of an appropriate base, such as a compound that forms an alkylammonium salt, such as tetrabutylammonium hydroxide, can be added to adjust the pH of the gel to a pH of between about 6 to about 8, inclusive, preferably to a pH of about 7. The ratio of $Fe^{2+}$: polyamine can be about 0.1 to about 1, preferably about 0.1 to about 0.5, most preferably about 0.1 to about 0.3, where these values are inclusive. The mixture can be seeded with SAPO-34 and/or Fe-SAPO-34 crystals that had been prepared previously. The SAPO-34 or Fe-SAPO-34 crystals may be "as made" (that is template containing) or calcined. Preferably the seeding is performed using about 2.0 wt. % of the previously formed crystals based on the $SiO_2$ content of the gel. By seeding the gel with the SAPO-34 crystals and then varying the length of the crystallization time it is possible to reduce the crystal size without affecting the crystallinity of the final product. For example, by adding 2% wt. of SAPO-34 previously prepared into the starting gel, it was possible to reducing the crystallization time from 2 days to 10 hours to obtain highly crystalline SAPO-34 of the same size crystals.

The mixture of the silicoaluminophosphate gel, the polyamine and the iron salt, which formed a sol gel, can be stirred for about 90 minutes, and then heated at a temperature for a sufficient time for the formation of the desired product. In one embodiment, the mixture is heated at about 220° C. for about 10 hours to 2 days. The crystalline product can then be separated from fine grained amorphous solid that forms. This can be done by suspending the products in water, sonicating the mixture to separate the crystalline material from fine grained amorphous solid, and removing the crystalline by decanting. The crystalline material can then be collected by filtration, washed and dried. Preferably, the crystalline material is washed with deionized water. The crystalline material can be dried at an elevated temperature, preferably at about 80° C., for a time sufficient to produce dried samples. The material produced had a purple color.

When the above procedure was performed using tetraethylammonium hydroxide in place of the polyamine in the synthesis, SAPO-34 was formed without iron in the crystals.

The use of DETA resulted in fewer intergrown crystals, as observed by SEM measurements, compared to the use of other polyamines.

Methods of Making $Fe^{+3}$ SAPO-34 Compositions

In still another aspect of the invention, calcined compositions comprising Fe-SAPO-34, where the iron is present predominantly as $Fe^{+3}$ and the iron cations are located mainly in extra-framework positions are made by calcining a composition comprising organic complexes of Fe in a SAPO-34 structure, where the Fe is present as $Fe^{+2}$ cations. The $Fe^{2+}$ in the material to be calcined has the $Fe^{2+}$ complexed with a polyamine. This material has the $Fe^{2+}$ in extra framework positions. During calcination, the linear polyamine is removed, the $Fe^{2+}$ ions are oxidized to $Fe^{3+}$ ions and the $Fe^{3+}$ ions remain in the extra framework positions.

Compositions comprising organic complexes of Fe in a SAPO-34 structure, where the Fe is present as $Fe^{3+}$ cations, are not formed when $Fe^{3+}$ (for example as $FeCl_3$) is used in place of $Fe^{2+}$ in making the gel. Instead, the $Fe^{3+}$ becomes reduced to $Fe^{2+}$ and becomes complexed by the amine, giving purple products similar to those prepared when starting with $Fe^{2+}$ salts in the sol gel. This is because the formation constant of $Fe^{3+}$ with polyamines is much lower than the formation constant of $Fe^{2+}$ with polyamines and (2) the synthesis conditions are reducing.

In still another aspect of the invention, the method produces a calcined Fe-SAPO-34 silicoaluminophosphate comprising $Fe^{3+}$ or a mixture of $Fe^{2+}$ and $Fe^{3+}$, wherein the $Fe^{3-}$ is present in an amount greater than or equal to 90% of the total amount of Fe in calcined Fe-SAPO-34 silicoaluminophosphate. The composition can comprise up to about 8% by weight, preferably from 0-5% by weight, based on the total weight of the composition. The method comprises calcining an Fe-SAPO-34, where the Fe is only present as $Fe^{2+}$ when analyzed by Mössbauer spectroscopy, the $Fe^{2+}$ is located in extra-framework locations and the $Fe^{2+}$ is present in a polyamine complex, at a temperature and for a time sufficient to remove the polyamine from the polyamine complex and oxidize the $Fe^{+2}$ to $Fe^{+3}$. The calcined Fe-SAPO-34 silicoaluminophosphate can comprise iron in various states that is substantially free from $Fe^{0}$. In a preferred embodiment, the calcination is performed at 560° C. for 12 hours in dry oxygen.

In another aspect of the invention, an article comprises a catalyst composition comprising calcined Fe-SAPO-34 silicoaluminophosphate comprising $Fe^{3+}$ or a mixture of $Fe^{2+}$ and $Fe^{3+}$, wherein the $Fe^{3+}$ is present in an amount greater than or equal to 90% of the total amount of Fe in calcined Fe-SAPO-34 silicoaluminophosphate, and the calcined Fe-SAPO-34 silicoaluminophosphate does not comprise $Fe^{0}$.

In still another aspect of the invention, Fe-containing SAPO-34 having the iron present as $Fe^{+3}$ with these cations located mainly in extra-framework positions can be used to convert NOx from exhaust gases by contacting the exhaust gas with a calcined Fe-SAPO-34 silicoaluminophosphate comprising $Fe^{3+}$ or a mixture of $Fe^{2+}$ and $Fe^{3+}$, where the $Fe^{3+}$ is present in an amount greater than or equal to 90% of the total amount of Fe in calcined Fe-SAPO-34 silicoaluminophosphate, and the calcined Fe-SAPO-34 silicoaluminophosphate does not comprise $Fe^{0}$.

The following examples illustrate the invention; the skilled person will recognize many variations that are within the spirit of the invention and scope of the claims.

EXAMPLES

Example 1 (Purple Sample)

Orthophosphoric acid (85%), fumed silica powder (0.007 μm), aluminum hydroxide, deionized water, tetraethylenepentamine (TEPA) and iron (II) acetate were mixed together. An excess of the tetraethylenepentamine (TEPA) was added dropwise to adjust the gel pH to 7. The mixture was seeded (2.0 wt. % of the $SiO_2$ content) with calcined Fe-SAPO-34 that had been prepared previously. The mixture of these components formed a sol gel. These components were present in the sol gel in a ratio of:

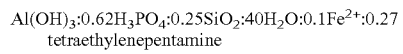

$Al(OH)_3$:0.62$H_3PO_4$:0.25$SiO_2$:40$H_2O$:0.1$Fe^{2+}$:0.27 tetraethylenepentamine The mixture was stirred for 90 minutes, and then placed in an oven at 220° C. for 10 hours. The resultant products were suspended in water and sonicated to force separation of crystalline from fine grained amorphous solid, which was removed by decanting. Then, the crystalline materials were collected by filtration, washed with deionized $H_2O$, and dried in air at 80° C. for 12 hours. This material, referred to herein as "as-prepared", had a purple color.

A portion of the dried product was then calcined in a tube furnace at 560° C., with a heating rate of 20° C. $min^{-1}$, for 14 hours in a stream of dry oxygen. This material, referred to herein as "calcined", had an ochre (a light brownish-yellow) color.

The resulting product had the XRD pattern of SAPO-34, a Si/(Al+P+Si) ratio of 0.14, and contained 4.0 wt. % of Fe, determined by XRF and AAS, respectively.

Figure 2A:
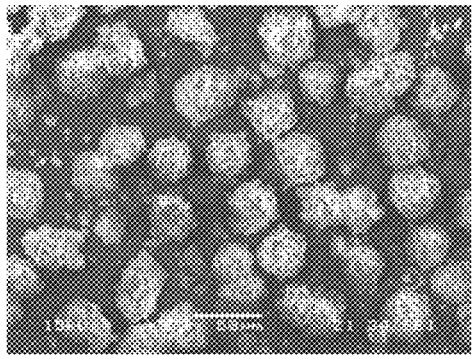
FIGS. 2A-2F illustrates SEM results from calcined material of Examples 1-5 and Comparative Example 7.

FIG. 1A shows the X-ray diffraction patterns of the as-prepared and calcined materials. The calcined sample had a surface area of 274 $m^2$/g and a micropore volume of 0.14 $cm^3$/g. The SEM (FIG. 2A) shows intergrown crystals with an average linear dimension of 20-25 μm.

Figure 3A:
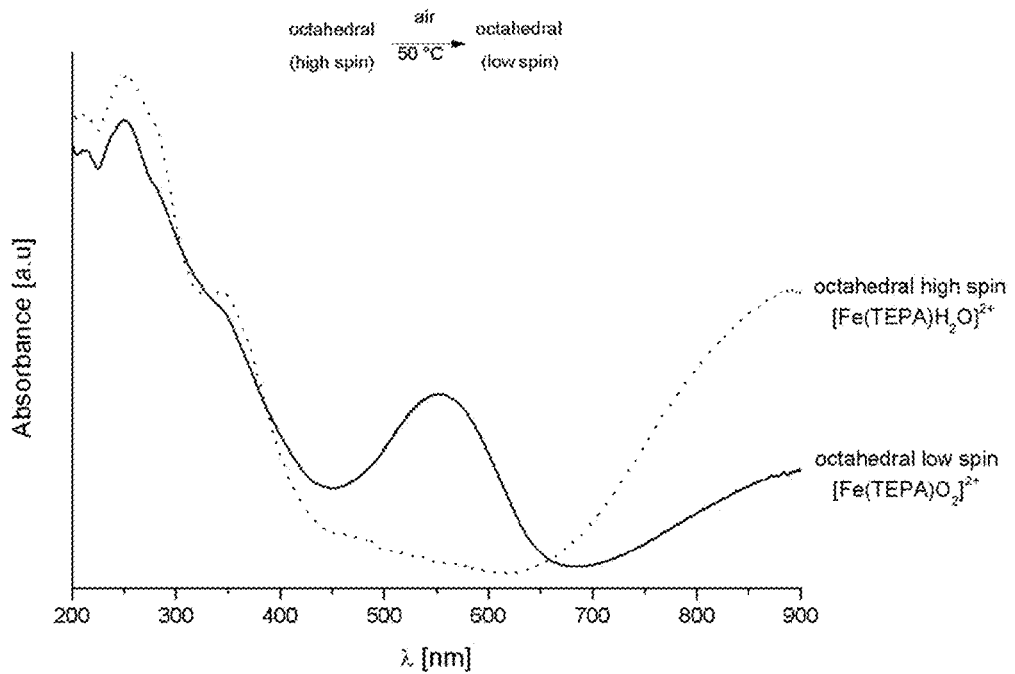
FIG. 3A shows the UV-Visible absorption spectra of octahedral high spin and low spin Fe(TEPA) species.
Figure 3B:
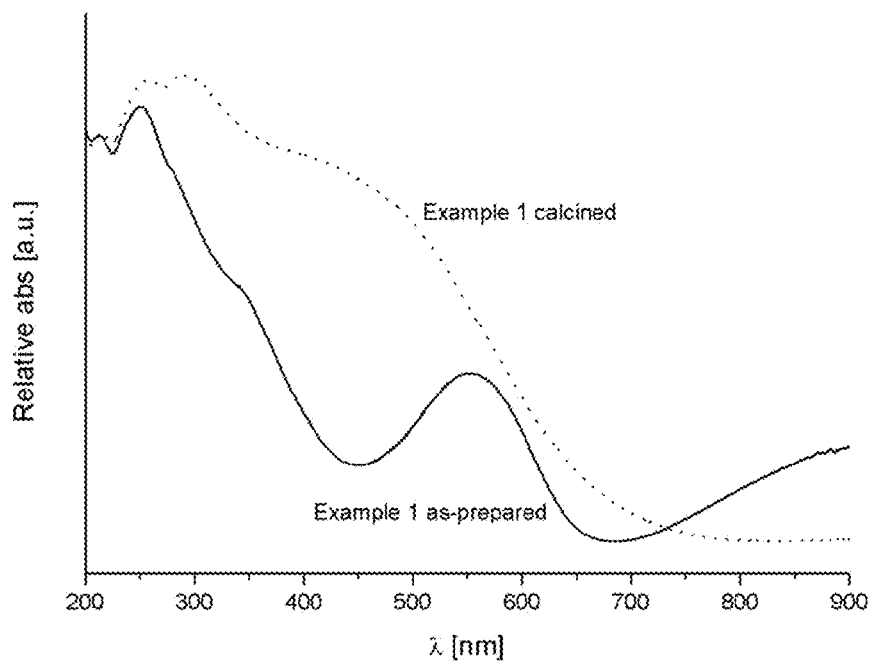
FIG. 3B shows the UV-Visible absorption spectra of as-prepared and calcined materials from Example 1.

As-prepared 'wet', dried and calcined materials from Example 1 were analysed by solid state UV-Visible absorption spectroscopy (FIGS. 3A 3B). The as-prepared wet sample (after filtration) is white in color while after overnight drying at 50° C. in air the color changes to pink. However, the color does not change if the sample is dried in a vacuum. The absorption band around 900 nm is very intense in the white sample. This has been attributed to an $Fe^{2+}$ high spin, octahedral complex, in which the iron cation is coordinated to 5 N atoms of polyamine and one water molecule. (D. M. Templeton, Molecular and cellular iron transport, Marcel Dekker, 2002). The pink sample shows a strong d-d transition band at 550 nm that we attribute to the entry of $O_2$, in substitution of the water molecule, in the coordination sphere of the iron. (I. V. Korendovych, O. P. Kryatova, W. M. Reiff, E. V. Rybak-Akimova, Inorganic Chemistry, 2007, 46, 4197-4211; J. E. Boldwin, J. Huff, JACS, 1973, 95(17), 5757-5759). The change of ligands causes a reduction of the crystal field splitting Δ ($O_2$ is a weaker ligand than $H_2O$) with consequent stabilization of the low spin configuration.

Figure 3C:
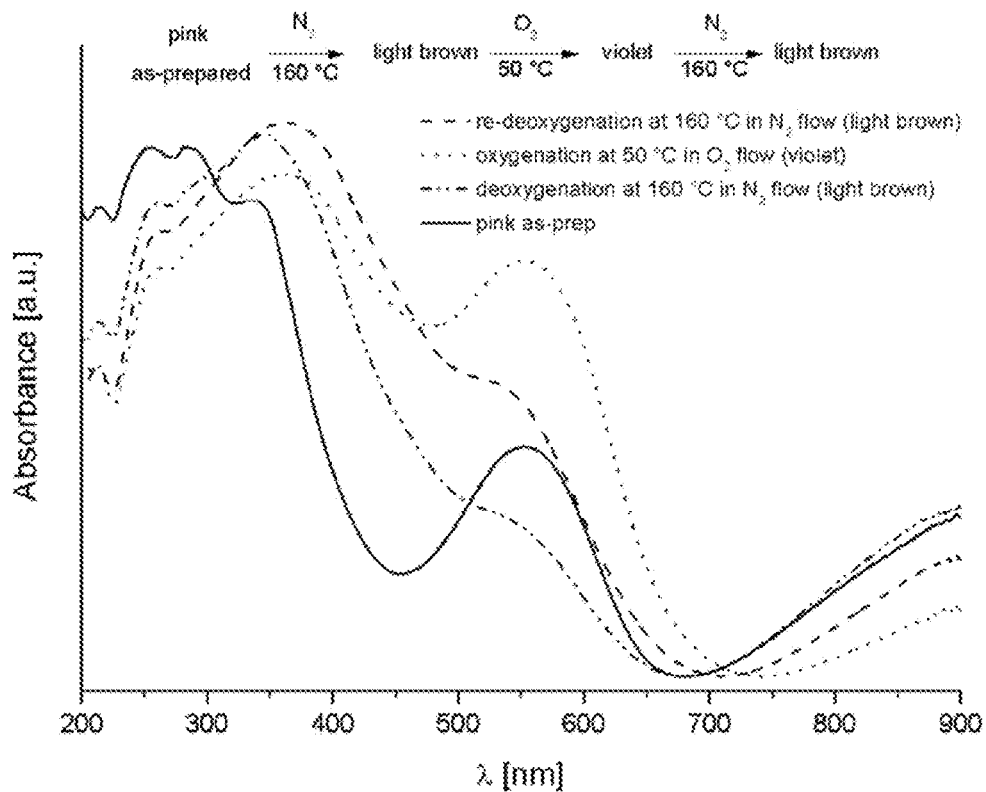
FIG. 3C shows the UV/Visible absorption spectra of various compounds incubated under various conditions.

In order to prove the coordination of molecular $O_2$, the as-prepared pink samples have been dehydrated/deoxygenated in a tube furnace at 160° C. under $N_2$ flow: the color changed from pink to light brown. The spectrum in FIG. 3C shows a decrease of the absorption band at 550 nm and an increase for that at 350 nm. After flowing $O_2$ at 50° C. overnight on the light brown sample the color changed to violet with consequent reappearance of a strong band at 550 nm. Different cycles have been successfully repeated proving the reversibility of the system. Thus Fe-SAPO-34 prepared using the methods described in this patent is suitable as a reversible $O_2$ carrier.

After the removal of the organic ligand upon calcination the absorption band at 550 nm disappears (FIG. 3B). The spectrum of the calcined material shows a broad band between 350-700 nm due to the presence of extra-framework iron species including isolated and/or hydrated $Fe^{3+}$ cations, and/or dimeric or oligomeric $Fe^{3+}$ species. It is possible that a small portion of the iron could also be incorporated within the SAPO-34 framework.

Figure 4A:
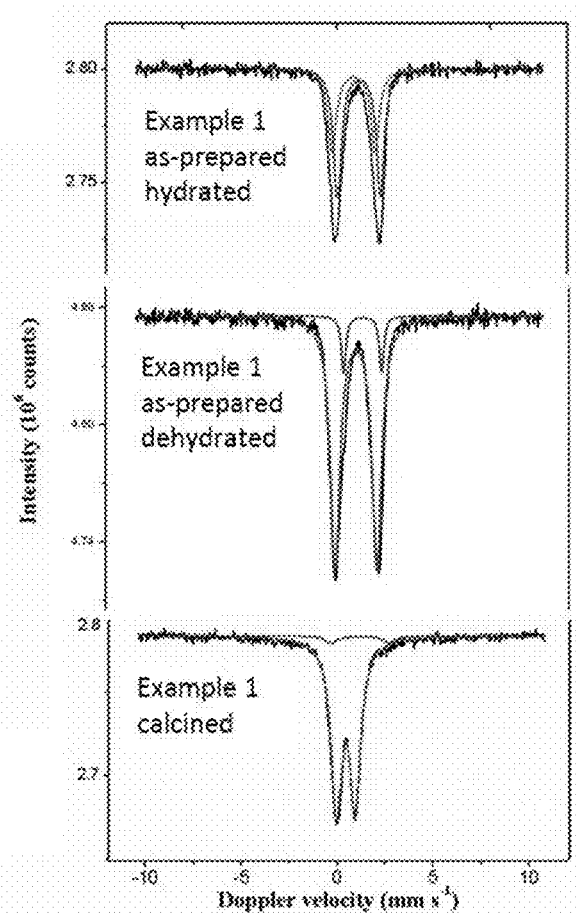
FIGS. 4A-4C shows Mössbauer absorption spectra from the as-prepared and calcined samples of Examples 1, 2 and 7 measured at 300 K.

Mössbauer absorption spectra from the as-prepared hydrated and dehydrated and calcined samples of Example 1, measured at 300 K, are shown in FIG. 4A. The fitted parameters of the Mössbauer absorption spectra for the as-prepared and calcined samples of Example 1 are given in Table 1.

TABLE 1

Mössbauer spectral fit parameters for Example 1 in as-prepared and calcined forms at 300 K.

| Sample | IS (mm s$^{-1}$) | QS (mm s$^{-1}$) | Γ (mm s$^{-1}$) | Species | Spectral contribution % |
|---|---|---|---|---|---|
| Example 1, as-prepared - hydrated | | | | | |
| Component 1 | 1.15 | 2.23 | 0.51 | $Fe^{2+}$ | 59 |
| Component 2 | 0.87 | 2.22 | 0.54 | $Fe^{2+}$ | 41 |
| Example 1, as-prepared - dehydrated | | | | | |
| Component 1 | 1.32 | 2.23 | | $Fe^{2+}$ | 10 |
| Component 2 | 0.98 | 2.16 | | $Fe^{2+}$ | 90 |
| Example 1, calcined | | | | | |
| Component 1 | 0.38 | 0.92 | 0.66 | $Fe^{3+}$ | 96 |
| Component 2 | 1.22 | 3.43 | 0.66 | $Fe^{2+}$ | 4 |

Experimental uncertainties: Isomer shift (IS): ±0.01 mm s$^{-1}$; Quadrupole Splitting (QS): ±0.01 mm s$^{-1}$; Line width (Γ): ±0.01 mm s$^{-1}$; Hyperfine field: ±0.1 T; Spectral contribution: ±3%

Mössbauer analysis of the as-prepared hydrated material of Example 1 shows that the material contained iron in the form of $Fe^{2+}$, with the iron being present as two different species (locations) at about 60% and 40%, respectively. Both the contributions has been assigned to $Fe^{2+}$-TEPA complex, respectively the 40% to $[Fe(TEPA)O_2]^{2+}$ complex and the 60% to $[Fe(TEPA)H_2O]^{2+}$ complex.

Clear differences were observed in the Mössbauer spectrum measured on the as-prepared sample after a drying treatment in air (120° C., 3 h), compared to the fresh sample. The initial octahedral $[Fe(TEPA)H_2O]^{2+}$ species (59%) are now reduced to 10% while the I.S. value of the remaining signal is 0.98 mm s$^{-1}$. The increase of the isomer shift value is related to a decrease in the s-electron density at the iron nucleus that might be due to the absence of $O_2$ or $H_2O$ in the coordination sphere of $Fe^{2+}$.

When an as-prepared sample was analysed by Mössbauer spectroscopy at the temperature of liquid helium temperature, only $Fe^{2+}$ species were observed. This indicates that the amount of $Fe^{3+}$ in the sample, if any, would have to be less than the experimental uncertainty, 3% of the total amount of iron present.

The Mössbauer analysis of calcined material of Example 1 shows that upon calcination almost all the iron contained in the material (96%) has been oxidized to $Fe^{3+}$. This contribution has been attributed to $Fe^{3+}$ well-dispersed (Γ 0.66 mm s$^{-1}$) in extra-framework positions.

Example 2 ("Pale Purple")

Example 2 was made with a different procedure in which an iron-amine complex is prepared before being added to a mixture of phosphoric acid, silica and aluminium hydroxide. A mixture of aluminum hydroxide, orthophosphoric acid (85%) and water was stirred for 1 hour, then fumed silica powder (0.007 μm) was added and the mixture was stirred for 1 hour. A structure-directing agent of a metal complex of $Fe^{2+}$ with tetraethylenepentamine, formed by adding iron (II) acetate to tetraethylenepentamine, was added to the mixture along with sufficient tetraethylenepentamine (~0.15 ml) to increase the pH to 7. The mixture of these components formed a sol gel. These components were present in the sol gel a ratio of:

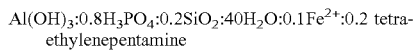
$Al(OH)_3:0.8H_3PO_4:0.2SiO_2:40H_2O:0.1Fe^{2+}:0.2$ tetraethylenepentamine Seeds of Fe-SAPO-34 (3.0% wt. respect to $SiO_2$) were added to the mixture, the mixture was stirred for 2 hours, and then placed in an oven at 220° C. for 1 day.

The resultant product was treated, collected and dried as described in Example 1. This material is referred to herein as "as-prepared" and it shows a pale purple color.

A portion of the dried product was then calcined in a tube furnace at 550° C., with a heating rate of 20° C. min$^{-1}$, for 12 hours in a stream of dry oxygen. This material is referred to herein as "calcined" and it shows an ochre color.

The resulting product had the XRD pattern of SAPO-34, had a Si/(Al+P+Si) ratio of 0.10, and contained 2.9 wt. % of Fe, determined by XRF and AAS respectively.

Figure 1B:
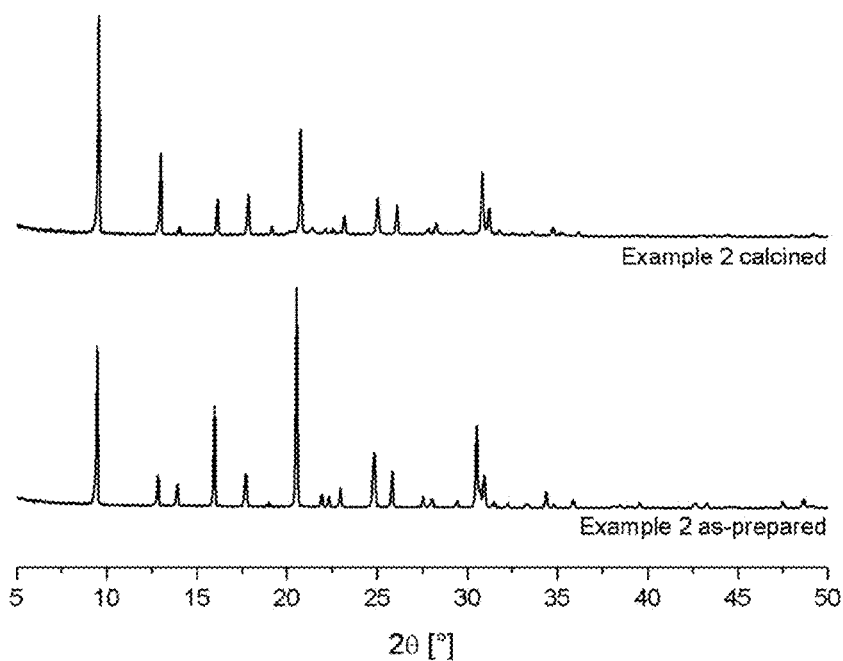

FIG. 1B shows the XRD patterns of the as-prepared material and the calcined material.

The calcined sample had a surface area of 131 m$^2$/g and a micropore volume of 0.06 cm$^3$/g.

Figure 2B:
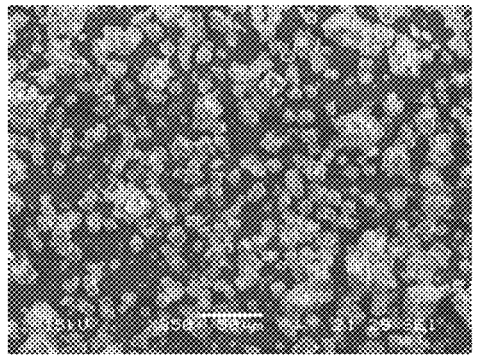

The SEM (FIG. 2B) shows rhombic crystals with a range of sizes (8-25 μm).

Figure 3D:
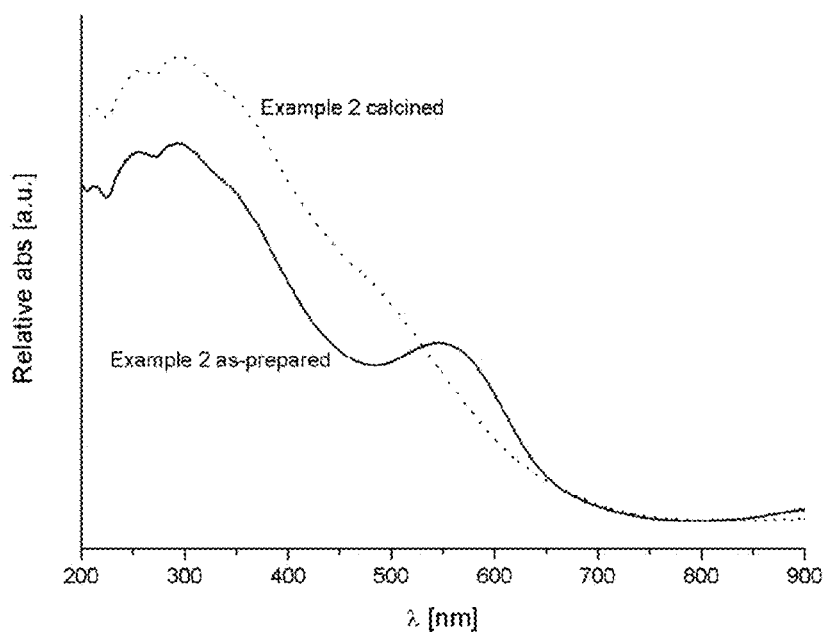
FIG. 3D shows the UV-Visible absorption spectra of as-prepared and calcined materials from Example 2.

The UV-visible spectra of the as-prepared and calcined materials are shown in FIG. 3D. The as-prepared material shows the characteristic band of low spin $[Fe(TEPA)O_2]^{2+}$ complex.

The absorption band at 550 nm is completely absent from the UV-Vis spectra of calcined samples. The weak broad band between 350-700 nm suggests that less iron is present in extra-framework positions than in Example 1. As in the Example 1 a little fraction of $Fe^{2+}$ could also being incorporated within the SAPO-34 framework.

Figure 4B:
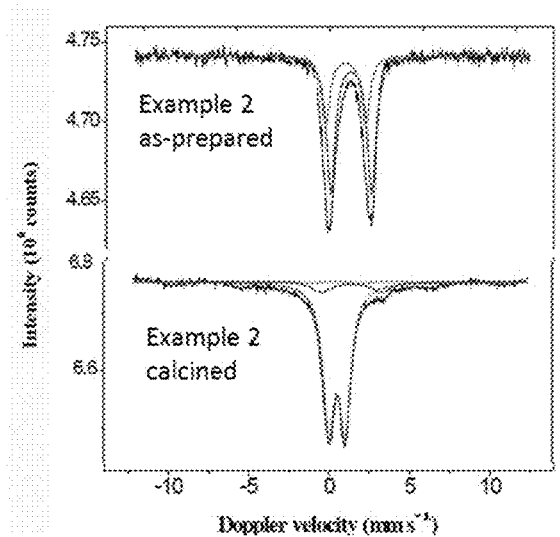

Mössbauer absorption spectra from as-prepared and calcined samples of Example 2 are shown in FIG. 4B. The fitted parameters of the Mössbauer absorption spectra for the as-prepared and calcined samples of Example 2 are shown in Table 2.

TABLE 2

Mössbauer spectral fit parameters for Example 5 in as-prepared and calcined forms at 300 K. (Pale purple)

| Sample | IS (mm s$^{-1}$) | QS (mm s$^{-1}$) | Γ (mm s$^{-1}$) | Species | Spectral contribution % |
|---|---|---|---|---|---|
| Example 2, as-prepared | | | | | |
| Component 1 | 1.13 | 2.18 | 0.56 | Fe2+ | 67 |
| Component 2 | 0.83 | 2.14 | 0.53 | $Fe^{2+}$ | 33 |
| Example 2, calcined | | | | | |
| Component 1 | 0.39 | 0.84 | 0.73 | Fe3+ | 93 |
| Calcined | 0.87 | 2.97 | 0.73 | $Fe^{2+}$ | 7 |

Experimental uncertainties: Isomer shift (IS): ±0.01 mm s$^{-1}$; Quadrupole Splitting (QS): ±0.01 mm s$^{-1}$; Line width (Γ): ±0.01 mm s$^{-1}$; Hyperfine field: ±0.1 T; Spectral contribution: ±3%

The Mössbauer spectra of as-prepared Example 2 shows the presence of only $Fe^{2+}$, which is present as two species in approximate amounts of 67% and 33%, as described in Example 1. Mössbauer analysis of the calcined material of Example 2 shows that upon calcination almost all the iron contained in the material (93%) has been oxidized to $Fe^{3-}$.

Examples 3-5 (Use of Different Polyamines as Complexing Ligands)

Examples 3-5 are materials comprising Fe-SAPO-34 made using different structure-directing agents (SDA), where each structure-directing agent was a metal complex of $Fe^{2+}$ with one of the linear polyamines diethylenetriamine (DETA) (Example 3), triethylenetetramine (TETA) (Example 4), or pentaethylenehexamine (PEHA) (Example 5). The materials of Examples 3-5 were made using the same general procedure described for Example 1.

The gel composition used for all the three examples was:

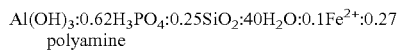
$Al(OH)_3:0.62H_3PO_4:0.25SiO_2:40H_2O:0.1Fe^{2+}:0.27$ polyamine

The mixture was placed in an oven at 220° C. for 2 days. The resultant product was treated, collected and dried as described in Example 1. These materials are referred to herein as "as-prepared."

A portion of the dried products was then calcined in a tube furnace at 560° C., with a heating rate of 20° C. $min^{-1}$, for 12 hours in a stream of dry oxygen. These materials are referred to herein as "calcined."

The as-prepared materials produced using each of the three structure-directing agents had a purple color.

Figure 1C:
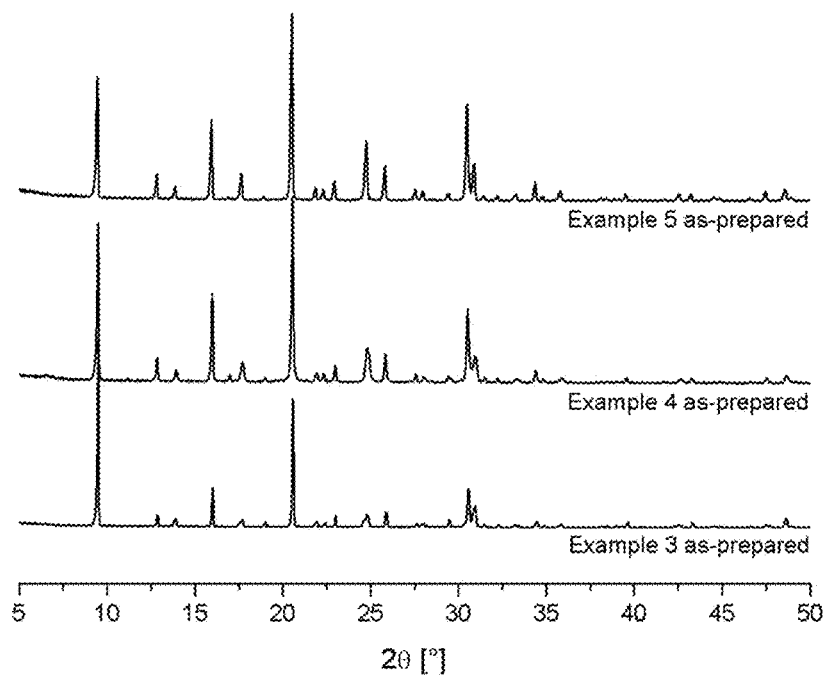
Figure 1D:
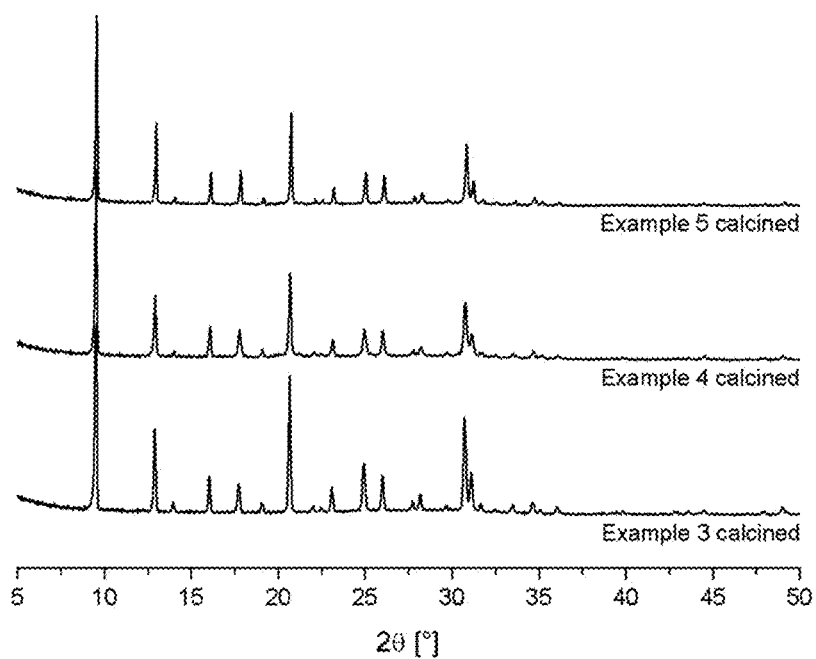

FIGS. 1C and 1D show the XRD pattern of the as-prepared materials and calcined materials, respectively. The XRD powder patterns of the as-prepared samples show that a pure SAPO-34 phase has been obtained in each of the materials produced using one of the three polyamines. Crystallinity was retained in each of the materials after removal of the structure-directing agent by calcination.

The resulting products had Si/Al+P+Si ratio of 0.11, 0.13, 0.09 and contained 2.2, 2.4, 1.7 wt. % of Fe, respectively for Example 3, Example 4 and Example 5. The final compositions were determined by EDX.

Figure 2C:
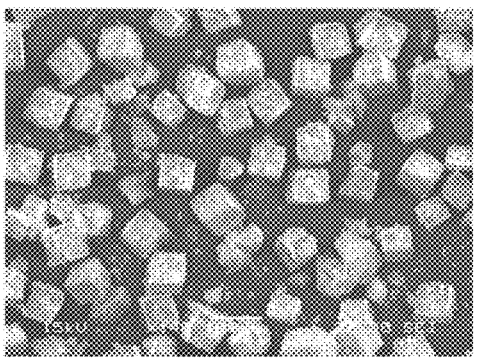
Figure 2D:
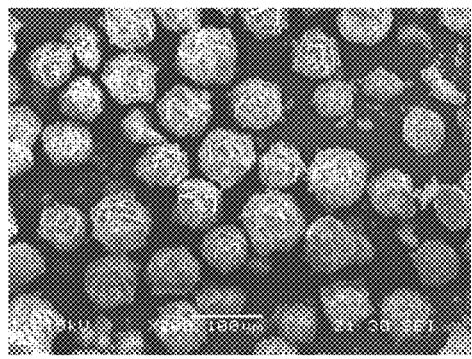
Figure 2E:
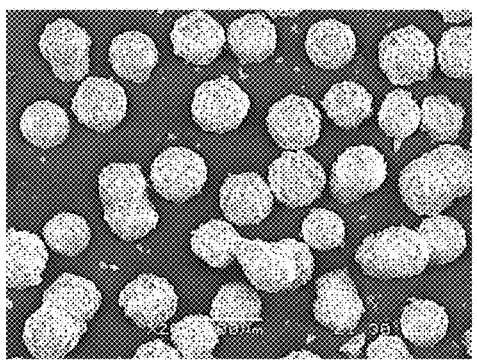

The SEMs of as-prepared samples show the morphologies of all crystals observed. The average crystals size is about 50 μm for all three materials. Fe-SAPO-34 crystals obtained using $Fe^{2+}$-DETA (FIG. 2C) as the SDA have a clearly defined cubic morphology. However, material produced using $Fe^{2+}$-TETA (FIG. 2D) or PEHA (FIG. 2E) as structure directing agents are crystals showing a highly intergrown morphology. Experiments (not provided) have shown that it is possible to reduce the crystal size of the material by altering the crystallization temperature and/or by the addition of SAPO-34 seeds within the starting gel.

Figure 3E:
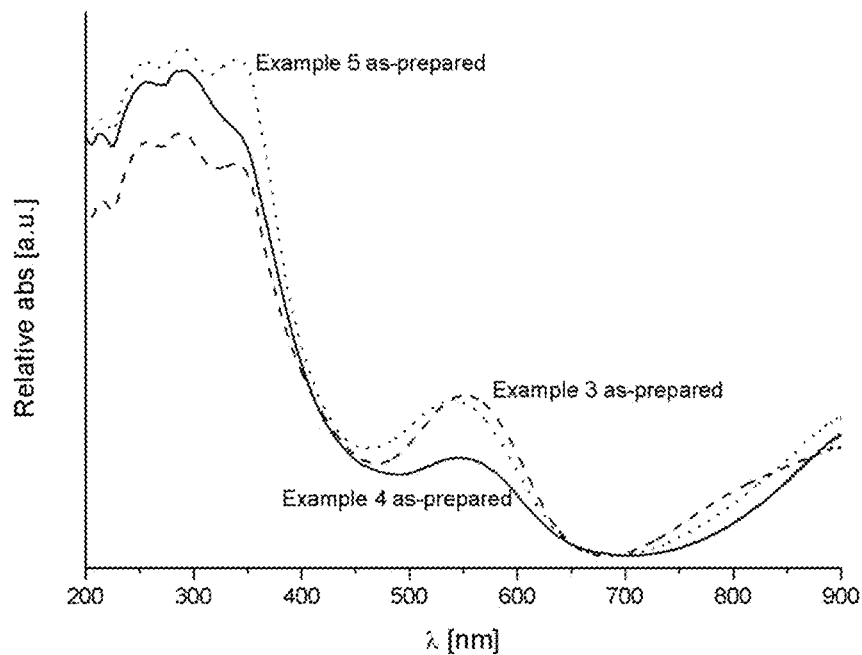
FIGS. 3E and 3F show the UV-Visible absorption spectra of as-prepared and calcined materials, respectively, from Examples 3, 4 and 5.
Figure 3F:
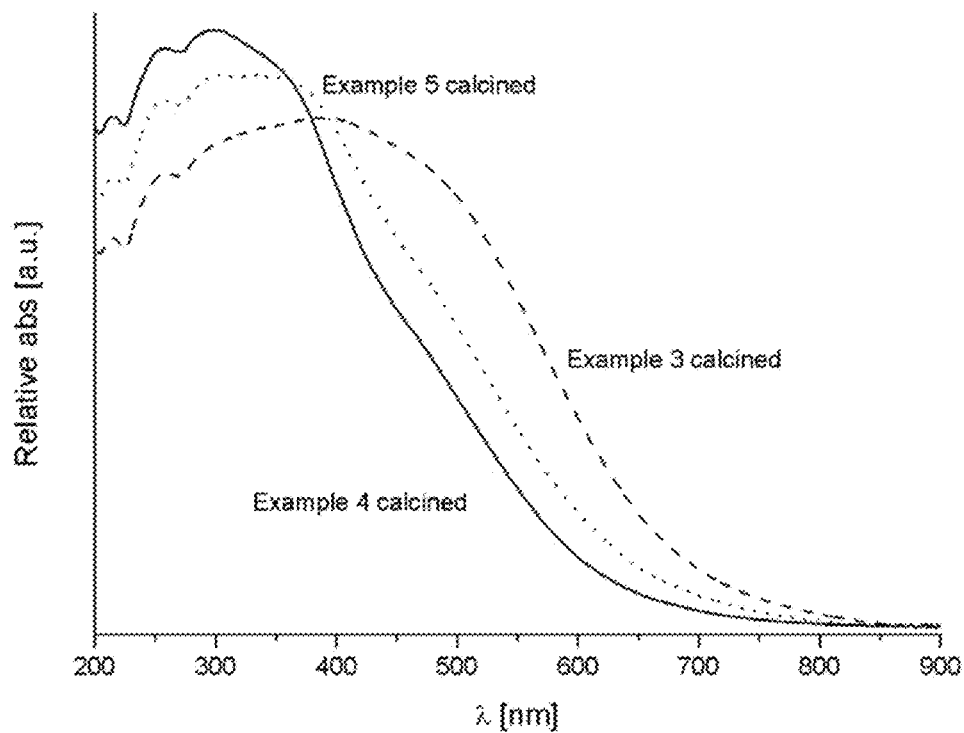

The UV-visible spectra of the as-prepared and calcined materials are shown in FIGS. 3E and 3F, respectively. All three as-prepared materials show the absorption band at $\lambda_{max}$=550 nm, characteristic of low spin $[Fe(polyamine) O_2]^{2+}$ complexes. The variation in absorbance of this band between the three different materials has been attributed to the different tendency of the $Fe^{2+}$ complexed by the three polyamines to coordinate molecular $O_2$. A strong band at 900 nm, characteristic of $[Fe(polyamine)H_2O]^{2+}$, is present for all three complexes. The absorption band at 550 nm is completely absent in the UV-Vis spectra of calcined samples. The broad band between 350-700 nm has been assigned as in Example 1. As in the Example 1 a little fraction of $Fe^{2+}$ could also being incorporated within the SAPO-34 framework.

Comparative Example (6). Synthesis Performed in Absence of Complexing Ligand and Using TEAOH as SDA Orthophosphoric acid (85%), fumed silica powder (0.007 μm), aluminum hydroxide, deionized water and iron (II) acetate were mixed together. Tetraethylammonim hydroxide (TEAOH) was added dropwise until the final gel reached a pH of 7. The mixture of these components formed a sol gel. These components were present in the sol gel a ratio of:

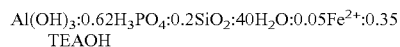
$Al(OH)_3:0.62H_3PO_4:0.2SiO_2:40H_2O:0.05Fe^{2+}:0.35$ TEAOH

The mixture was stirred for 2 hours, and then placed in an oven at 190° C. for 8 days. The resultant product was treated, collected and dried as described in Example 1. This material is referred to herein as "as-prepared" and it shows a light yellow color.

A portion of the dried product was then calcined in a tube furnace at 560° C., with a heating rate of 20° C. $min^{-1}$, for 12 hours in a stream of dry oxygen. This material is referred to herein as "calcined" and it shows a yellow color.

The resulting product had the XRD pattern of SAPO-34, had Si/Al+P+Si ratio of 0.12, and contained 0.61 wt. % of Fe, determined by EDX.

Figure 1E:
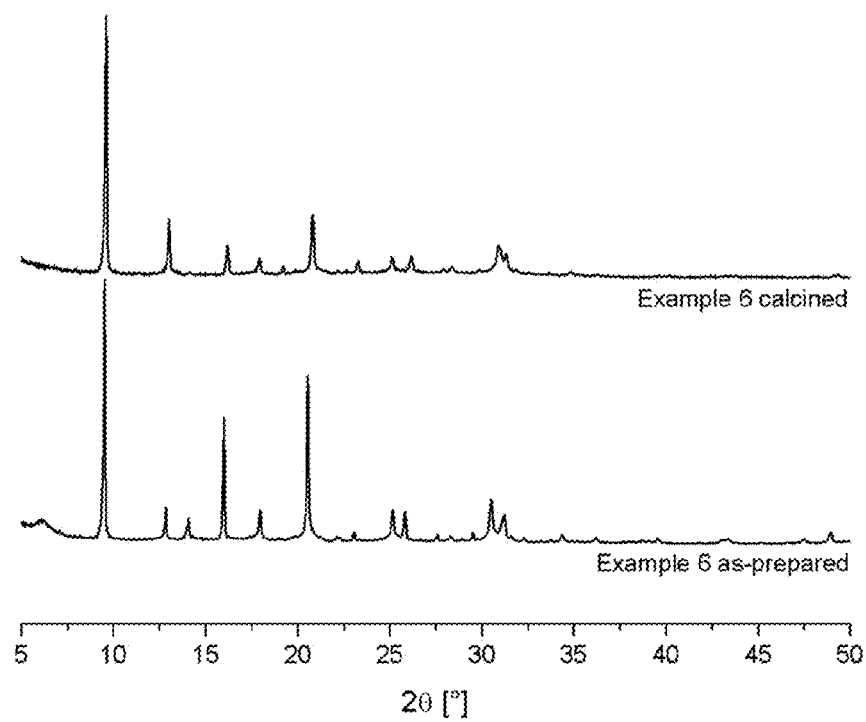

FIG. 1E shows the X-ray diffraction patterns of the as-prepared and calcined materials.

Figure 3G:
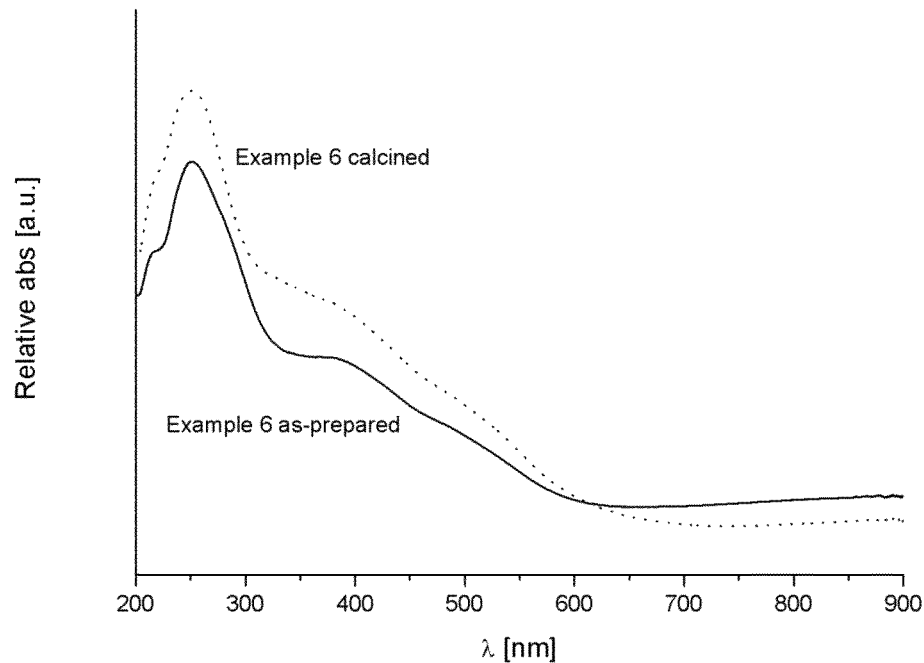
FIGS. 3G and 3H show the UV-Visible absorption spectra of as-prepared and calcined material from Examples 6 and 7, respectively.

No evident changes have been detected between the UV-visible absorption spectra of as-prepared and calcined samples (FIG. 3G). These results, together with the methodology used to synthesize the material suggest that iron cations might be incorporated mostly in intra-framework positions.

It appears clear that using $Fe^{2+}$-complexes as described in Example 1-5 we can introduce and prove the incorporation of iron cations in extra-framework position.

Comparative Example 7

The material produced in this example was made as described for Example 4 in U.S. Published Patent Application 2012/0251422 (the "'422 application"), except that a $P_2O_5:Al_2O_3$ ratio of 0.8 was used instead of the 1.1 ratio used in the application. If the ratio used was higher, AlPO-5 appeared as an additional phase). The sample made by Example 4 in the '422 application is comparative Example 7.

Figure 1F:
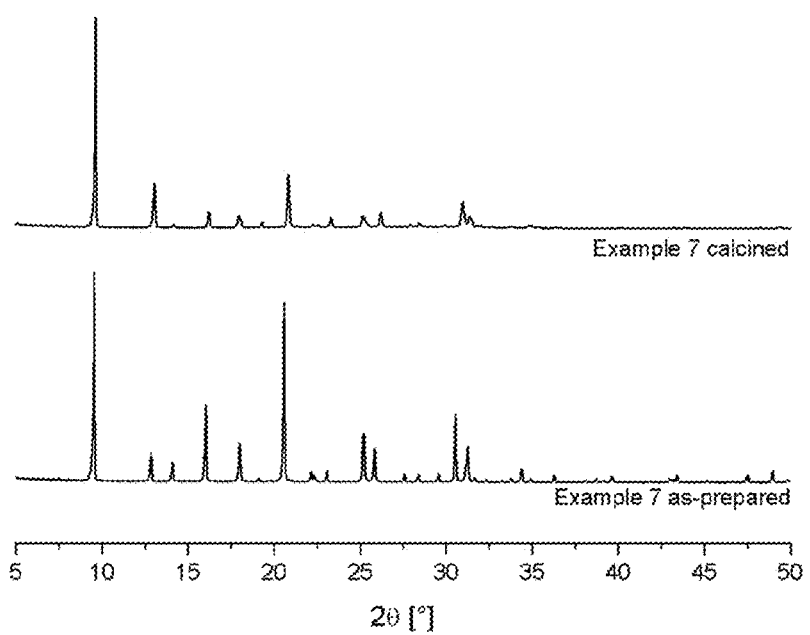
Figure 2F:
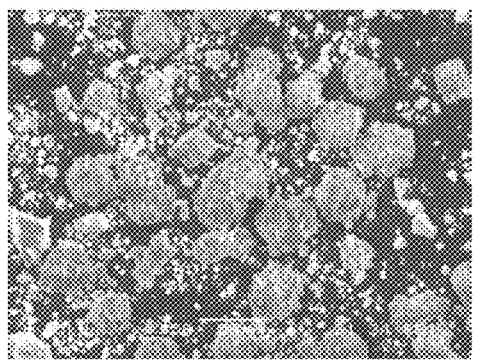

The material produced by the method of Example 4 of the '422 application was a pale white powder. The material was confirmed as having a pure SAPO-34-type structure by powder XRD analysis, as shown in FIG. 1F. The composition of Example 7 shows a Si/(Al+P+Si) ratio of 0.12 and 2.2 wt. % of Fe, determined by XRF and AAS respectively. The SEM image in FIG. 2F shows the crystal morphology.

The calcined sample had a surface area of 427 $m^2/g$ and a micropore volume of 0.23 $cm^3/g$.

Figure 3H:
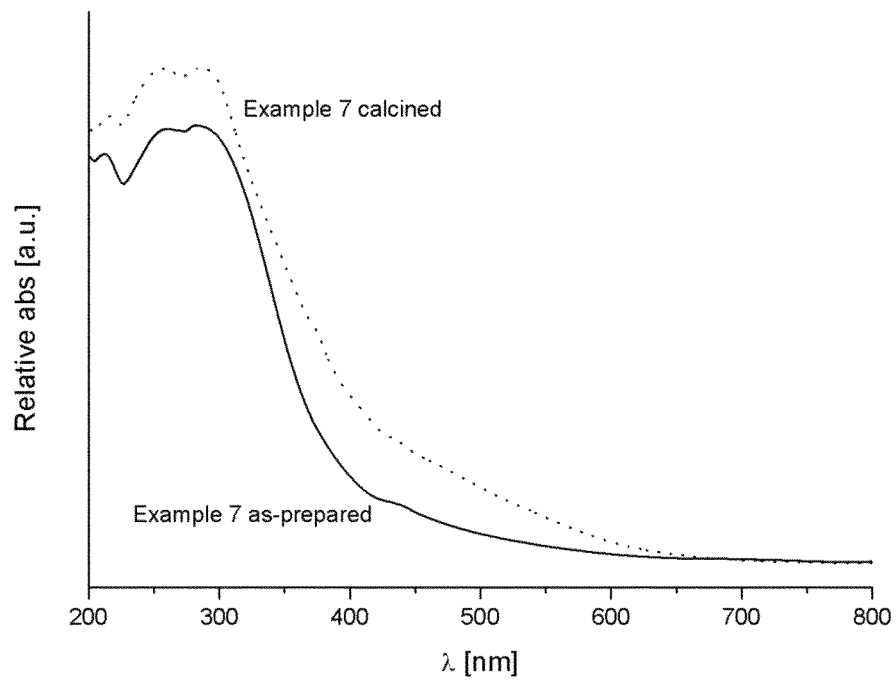

Solid state UV-Visible absorption spectra of the as-prepared Example 7 have narrow bands only at 250 nm and 290 nm (F. Wang, L. Liang, J. Ma, J. Sun, Mater. Lett., 2013, 111, 201-203). There are no evident changes between UV-visible spectra of as-prepared and calcined samples (FIG. 3H). These results are strongly different from what is observed for Example 1, where a broad absorption band is observed for the calcined material. Considered together with the methodology used to synthesize the materials suggests many fewer of the iron cations are incorporated in extra-framework positions in Example 7.

Figure 4C:
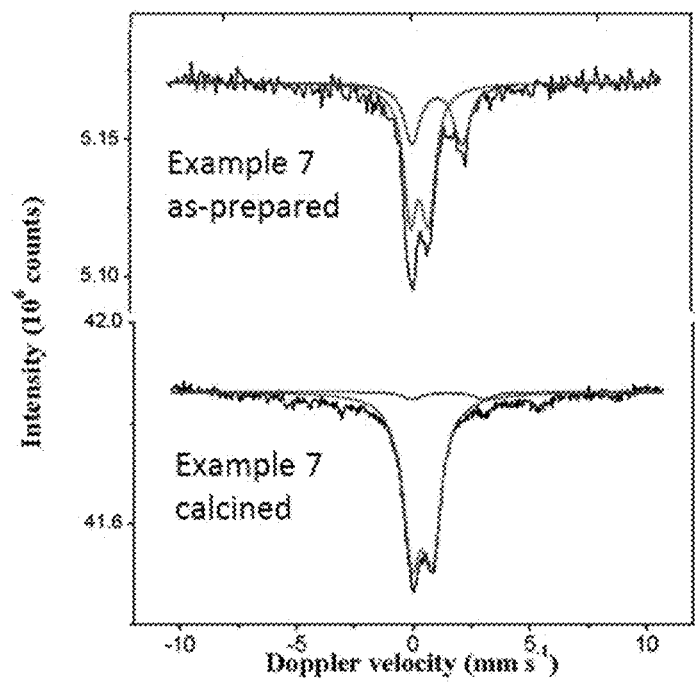

The Example 7 was analyzed by Mössbauer spectroscopy. Mössbauer absorption spectra from as-prepared and calcined material of Example 7 is shown in FIG. 4C. The Mössbauer absorption spectra parameters for the materials of Example 7 are shown in Table 4.

TABLE 4

Mössbauer spectral fit parameters for $Fe^{2+}$ and $Fe^{3+}$ species for Example 7 in as-prepared and calcined forms at 300 K.

| Sample | IS (mm s$^{-1}$) | QS (mm s$^{-1}$) | Γ (mm s$^{-1}$) | Phase | Spectral contribution % |
|---|---|---|---|---|---|
| Example 7, as-prepared | | | | | |
| Species 1 | 1.12 | 2.13 | 0.82 | $Fe^{2+}$ | 36 |
| Species 2 | 0.37 | 0.76 | 0.71 | $Fe^{3+}$ | 64 |
| Example 7, calcined | | | | | |
| Species 1 | 0.36 | 0.85 | 1.05 | $Fe^{3+}$ | 95 |
| Species 2 | 1.50 | 1.43 | 1.05 | $Fe^{2+}$ | 5 |

Experimental uncertainties: Isomer shift (IS): ±0.01 mm s$^{-1}$; Quadrupole Splitting (QS): ±0.01 mm s$^{-1}$; Line width (Γ): ±0.01 mm s$^{-1}$; Hyperfine field: ±0.1 T; Spectral contribution: ±3%

The as-prepared material of Example 7, which has prepared using the method described in the '422 application, contained two species of iron: $Fe^{3+}$ and $Fe^{2+}$, with $Fe^{3+}$ and $Fe^{2+}$ accounting for 64% and 36% of the total amount of iron, respectively. Both the components have been attributed to octahedral $Fe^{2+}$ and $Fe^{3+}$ incorporated within SAPO-34 with two water molecules to complete the 6-fold coordination.

The calcined material of Example 7, which has been prepared using the method described in the '422 application, contained mainly $Fe^{3+}$ 95%, while the residual 5% belongs to $Fe^{2+}$. Comparing the main contribution with that of Example 1 clearly shows a difference in the line width Γ: the smaller value measured for the Example 1 (0.66 mm s$^{-1}$) indicating the presence of better dispersed Fe species in that Example.

Examples 8-12 (Use of Different Iron Sources)

Examples 8-12 are materials comprising Fe-SAPO-34 made using different iron sources that include: iron (II) oxalate dihydrate (Example 8), iron (II) chloride (Example 9), iron (II) sulfate heptahydrate (Example 10), iron (III) chloride hexahydrate (Example 11) iron (III) nitrate nonahydrate (Example 12). The materials of Examples 8-12 were made using the same general procedure described for Example 1.

The gel composition used for each of these three examples was:

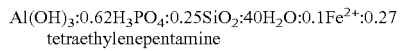

$Al(OH)_3:0.62H_3PO_4:0.25SiO_2:40H_2O:0.1Fe^{2+}:0.27$ tetraethylenepentamine

The mixture was placed in an oven at 220° C. for 1 day. The resultant products were treated, collected and dried as described in Example 1. These materials are referred to herein as "as-prepared."

A portion of the dried products was then calcined in a tube furnace at 560° C., with a heating rate of 20° C. min$^{-1}$, for 12 hours in a stream of dry oxygen. These materials are referred to herein as "calcined."

The as-prepared materials produced using each of the three structure-directing agents had a purple color.

Figure 1G:
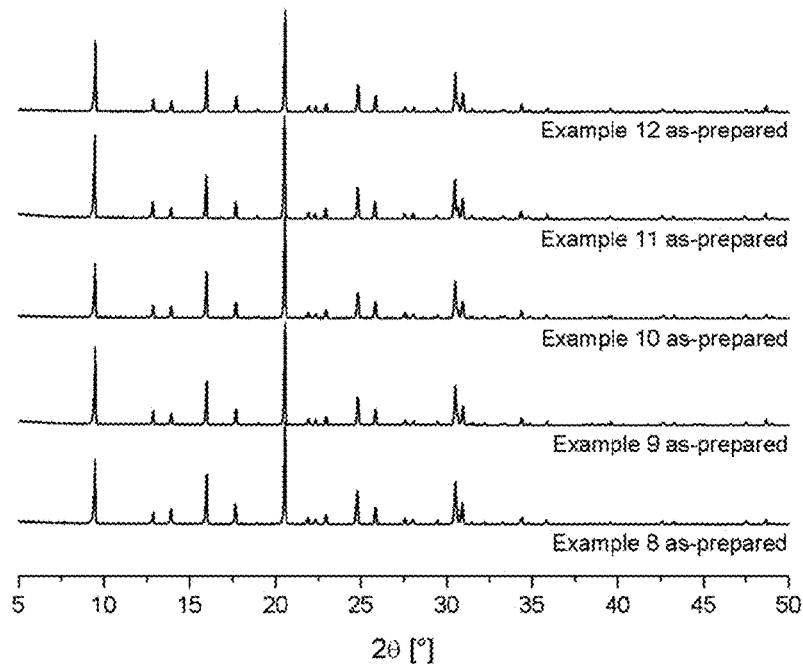
Figure 1H:
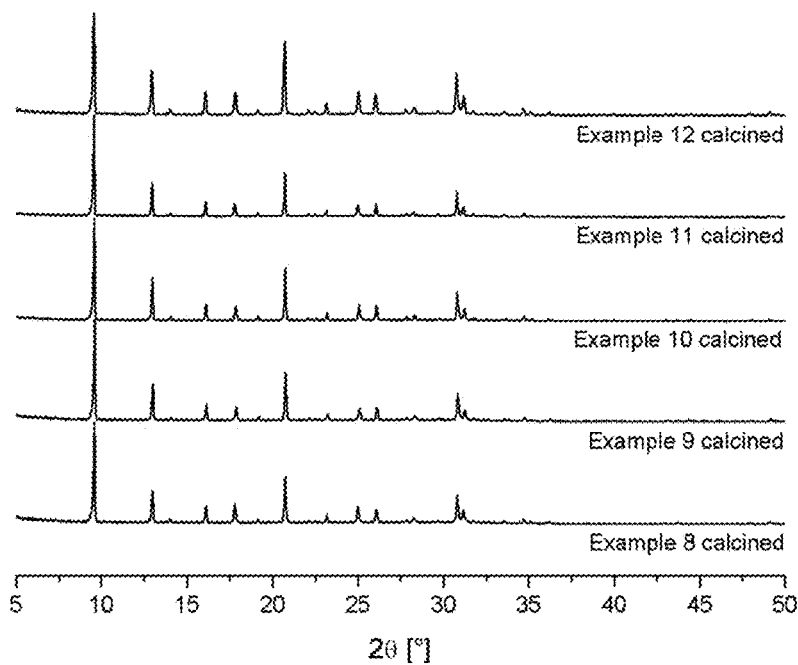

FIGS. 1G and 1H show the XRD pattern of the as-prepared materials and calcined materials, respectively. The XRD powder patterns of the as-prepared samples show that a pure SAPO-34 phase has been obtained in each of the materials produced using different iron sources. Crystallinity was retained in each of the materials after removal of the structure-directing agent by calcination.

The resulting products had Si/Al+P+Si ratio of 0.13, 0.13, 0.14, 0.14, 0.13 and contained approximately 2.3, 2.6, 2.3, 3.4, 3.2 wt. % of Fe, respectively for Example 8, Example 9, Example 10, Example 11 and Example 12. The final composition has been determined by EDX.

Figure 3I:
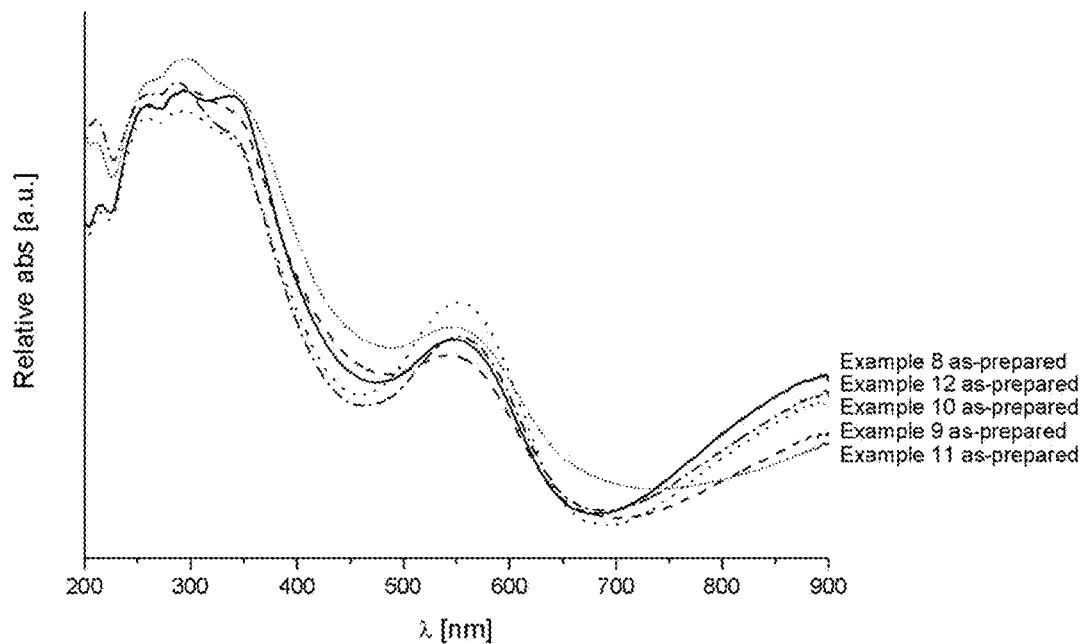
FIGS. 3I and 3J show the UV-Visible absorption spectra of as-prepared and calcined material, respectively, from Examples 8-12.
Figure 3J:
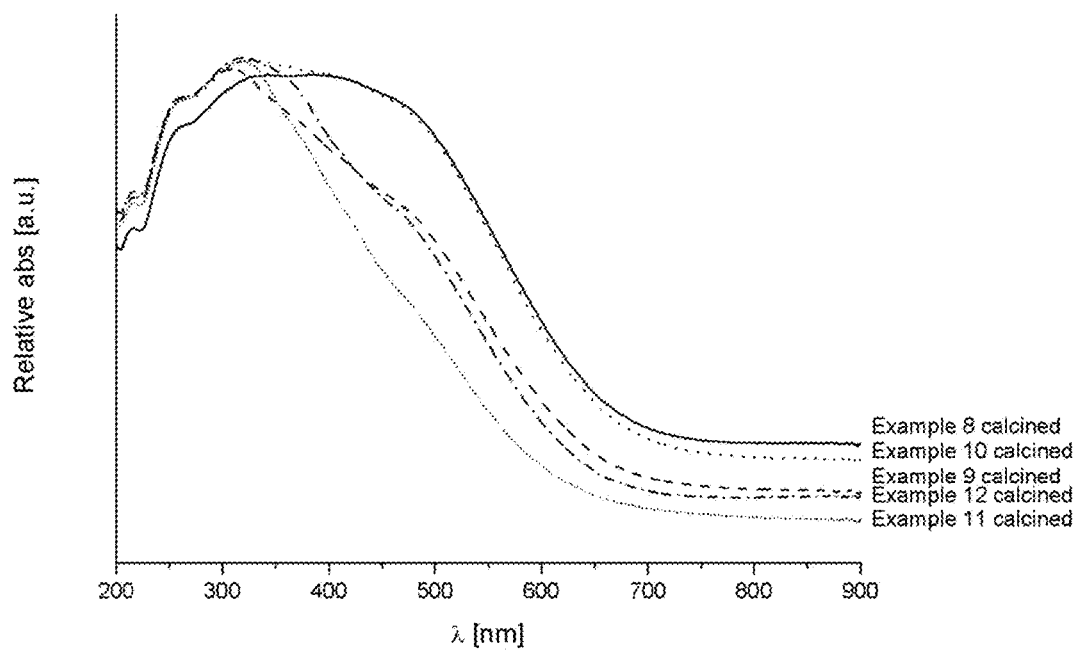

The UV-visible spectra of the as-prepared and calcined materials are shown in FIGS. 3I and 3J, respectively. All the as-prepared materials show the absorption band at $\lambda_{max}=550$ nm, characteristic low spin $[Fe(polyamine)O_2]^{2-}$ complexes. This band is weak in Example 11. All the materials show a band at 900 nm, characteristic of $[Fe(polyamine)H_2O]^{2+}$. The absorption band at 550 nm is completely absent in the UV-Vis spectra of calcined samples. The broad band between 350-700 nm, assigned as in Example 1, is very intense for Example 8 and 10, weaker for Example 9 and 12 and almost absent for Example 11. As in the Example 1 a little fraction of $Fe^{2+}$ could also being incorporated within the SAPO-34 framework.

Analysis of Catalytic Activity of Samples

Powder samples of calcined material described above were obtained by pelletizing the original samples, crushing the pellets and then passing the powder obtained through a 255 and 350 micron sieves to obtain a powder having particle size between 255 and 350 microns. The powder samples were loaded into a reactor and tested using the following synthetic diesel exhaust gas mixture (at inlet) including nitrogenous reductant: 350 ppm NO, 385 ppm $NH_3$, 12% $O_2$, 4.5% $H_2O$, 4.5% $CO_2$, 200 ppm CO, balance $N_2$ at a space velocity of 330 liters per gram of powder catalyst per hour. The samples were heated ramp-wise from about 150 to about 550° C. at 5° C./min and the composition of the off-gases were analyzed. The activity of the calcined materials of Examples 1, 2, and 7 to promote NOx conversion was then determined.

Figure 5:
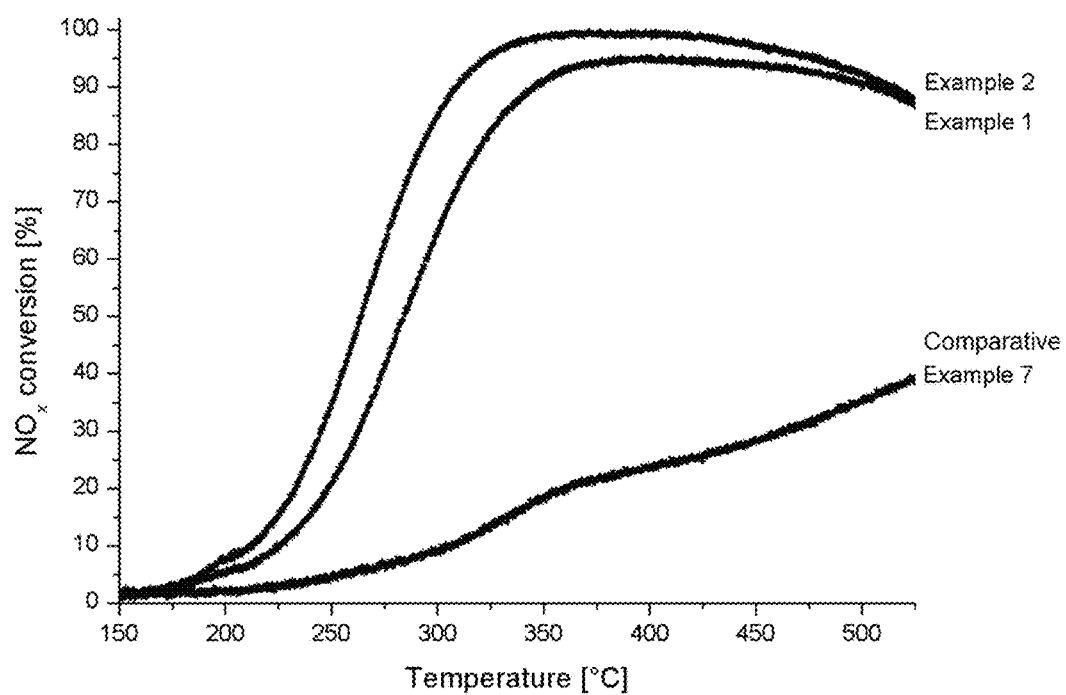
FIG. 5 shows the amount of NOx conversion using material of Examples 1, 2 and 7 at various temperatures.

As shown in FIG. 5, the catalytic activity of the calcined materials for NOx conversion from the materials of Example 1 and 2 was much greater that the catalytic activity of Example 7, which was prepared using the method of Example 4 in the '422 application. The material of Example 1 provided approximately 50% NOx conversion at about 280° C., about 75% NOx conversion at about 320° C., and about 90% NOx conversion at about 350° C. Example 2 provided 50% NOx conversion at about 260° C., 75% NOx conversion at about 280° C., and from greater than 90% to about 100% NOx conversion from about 300° C. to about 550° C. Example 7, which was prepared using the method of Example 4 in the '422 application, showed less than 10% NOx conversion up to about 300° C., about 20% NOx conversion starting at about 350° C. and about 30% NOx conversion starting at about 475° C. The compositions of Examples 1 and 2 provided over twice the NOx conversion provided by Example 7, which was prepared using the method of Example 4 in the '422 application, from about 250° C. to about 500° C.

We claim:

1. An Fe-SAPO-34 silicoaluminophosphate, wherein the Fe is only present as $Fe^{2+}$ when analyzed by Mössbauer spectroscopy and UV-visible spectroscopy and the $Fe^{2+}$ is in extra-framework locations and the Fe-SAPO-34 silicoaluminophosphate has not been calcined.

2. The Fe-SAPO-34 silicoaluminophosphate of claim 1, wherein the $Fe^{2+}$ is present in a polyamine complex.

3. The Fe-SAPO-34 silicoaluminophosphate of claim 2, wherein the $Fe^{2+}$ is present in two environments when analyzed by Mössbauer spectroscopy, with one environment having an isomer shift at about 1.15 mm $s^{-1}$ and another environment having an isomer shift at about 0.87 mm $s^{-1}$.

4. The Fe-SAPO-34 silicoaluminophosphate of claim 3, wherein the $Fe^{2+}$ in the phase having an isomer shift at about 1.15 mm $s^{-1}$ represents over 50% of the $Fe^{2+}$ in the Fe-SAPO-34 silicoaluminophosphate.

5. The Fe-SAPO-34 silicoaluminophosphate of claim 1, said silicoaluminophosphate having a solid state UV-Vis absorption spectrum with an absorbance maximum at about 550 nm.

6. An Fe-SAPO-34 silicoaluminophosphate that in its calcined state comprises $Fe^{3+}$ or a mixture of $Fe^{2+}$ and $Fe^{3+}$, wherein the $Fe^{3+}$ is present in an amount greater than or equal to 90% of the total amount of Fe in the calcined Fe-SAPO-34 silicoaluminophosphate, and the calcined Fe-SAPO-34 silicoaluminophosphate is substantially free from $Fe^0$ and the Fe cations are located mainly in the extra-framework positions.

7. The calcined Fe-SAPO-34 silicoaluminophosphate of claim 6, wherein the $Fe^{3+}$ is present in an amount greater than or equal to 95% of the total amount of Fe in calcined Fe-SAPO-34 silicoaluminophosphate.

8. The Fe-SAPO-34 silicoaluminophosphate of claim 6, wherein $Fe^{+3}$ is present in the calcined solid at from greater than 0% to 5% based on the weight of the composition.

9. A calcined Fe-SAPO-34 silicoaluminophosphate that in its calcined state comprises $Fe^{3+}$ or a mixture of Fe and $Fe^{3+}$, wherein the $Fe^{3+}$ is present in an amount greater than or equal to 90% of the total amount of Fe in the calcined Fe-SAPO-34 silicoaluminophosphate, and the calcined Fe-SAPO-34 silicoaluminophosphate is substantially free from $Fe^0$, said silicoaluminophosphate having a solid state UV-Vis absorption spectra having a continual decrease in absorption from 450 nm to 700 nm.

10. The calcined Fe-SAPO-34 silicoaluminophosphate of claim 9, wherein the $Fe^{3+}$ is present in an amount greater than or equal to 95% of the total amount of Fe in calcined Fe-SAPO-34 silicoaluminophosphate.

11. The Fe-SAPO-34 silicoaluminophosphate of claim 9, wherein $Fe^{+3}$ is present in the calcined solid at from greater than 0% to 5% based on the weight of the composition.

12. A method of preparing a Fe-SAPO-34 silicoaluminophosphate where the Fe is only present as Fe' when analyzed by Mössbauer spectroscopy and the $Fe^{2+}$ is located in extra-framework locations, the method comprising forming a mixture of phosphoric acid, silica, aluminium hydroxide, water, an organic linear polyamine and an iron salt.

13. The method of claim 12, wherein the mixture does not comprise a co-templating agent.

14. The method of claim 12, wherein the organic linear polyamine is diethylenetriamine (DETA), triethylenetetramine (TETA), tetraethylenepentamine (TEPA), pentaethylenehexamine (PEHA), or mixtures thereof.

15. The method of claim 12, wherein the Fe-SAPO-34 silicoaluminophosphate formed has a purple color.

16. A method of reducing the levels of NOx in an exhaust gas, the method comprising contacting an exhaust gas with an Fe-SAPO-34 silicoaluminophosphate of claim 6.

17. A method of reducing the levels of NOx in an exhaust gas, the method comprising contacting an exhaust gas with an Fe-SAPO-34 silicoaluminophosphate of claim 9.

* * * * *